United States Patent [19]

Voisin

[11] Patent Number: 4,646,448

[45] Date of Patent: Mar. 3, 1987

[54] OYSTER DREDGING APPARATUS

[75] Inventor: Ernest A. Voisin, Raceland, La.

[73] Assignee: Motivatit Seafoods, Inc., Houma, La.

[21] Appl. No.: 756,389

[22] Filed: Jul. 17, 1985

[51] Int. Cl.$^4$ .............................................. E02F 5/00
[52] U.S. Cl. ............................................ 37/55; 43/8
[58] Field of Search ..................... 37/55, 119; 43/8, 6;
114/210; 267/170, 174; 124/29

[56] References Cited

U.S. PATENT DOCUMENTS

| | | | |
|---|---|---|---|
| 2,002,599 | 5/1935 | Bennett | 37/55 |
| 2,442,974 | 6/1948 | Frederiksen | 43/6 |
| 3,279,411 | 10/1966 | Ellis | 114/210 |
| 3,608,217 | 9/1971 | Voisin, Sr. | 37/55 |

Primary Examiner—Clifford D. Crowder
Attorney, Agent, or Firm—Keaty & Keaty

[57] ABSTRACT

An apparatus for dredging bottom dwelling seafood such as oysters is comprised of a collecting basket pivotally carried by a frame, the basket having a pair of parallel arms rigidly fixed thereto. A pair of upright standards are mounted adjacent the edge of a boat, and each standard contains an arm receiving groove which is configured to receive the arms and pivot the basket upwardly about an axis through the arms to empty the contents of the basket. A spring loaded member slows movement of the basket as it pivots for more smoothly emptying the contents. The spring loaded member also stores potential energy for propelling the basket back into the water after it has been emptied.

14 Claims, 9 Drawing Figures

OYSTER DREDGING APPARATUS

BACKGROUND OF THE INVENTION

1. Field of the Invention

This invention concerns dredges for bottom dwelling seafood such as oysters. More particularly, it relates to a dredge which automatically and efficiently empties the oysters onto a boat, and then propels the dredge basket back into the water.

2. General Discussion of the Background

The background of the invention is more fully set forth in U.S. Pat. No. 3,608,217 which patent is fully incorporated by reference.

It is commonly known that bottom dwelling seafood such as oysters can be harvested by using a dredge which is dragged along the bottom of a body of water. The dredge fills with oysters, and must then be hoisted up into a boat where it is usually manually emptied and thrown back into the water. Manual upending and emptying of the basket, and manual launching of the empty oyster dredge, has proven time consuming and inefficient. Since oyster dredges are often quite heavy, the prior art approach has usually required several persons.

U.S. Pat. No. 3,608,217 disclosed an oyster dredge which could be automatically upended and emptied as it was dragged over the side of a boat. This prior art device proved, however, to be unworkable since it was structurally quite heavy. The weight of the device caused it to dig into soft surface formations on the bottom of the body of water. Another drawback with this device was that it was pivoted to an upended condition at a substantial speed, thereby often throwing oysters all over the deck of the boat. Yet another drawback with this prior art device was its inability to be effectively propelled a distance back into the water for additional dredging.

It is accordingly an object of this invention to provide an oyster dredge which can be automatically upended and emptied.

It is another object of the invention to provide such a dredge that is light enough that it will not dig into the surface of soft formations along which it is being dragged.

Yet another object of the invention is to provide a dredge having means for slowing movement of the dredge frame as it is being pivoted to an upended position.

Still another object of the invention is to provide such a dredge which can easily be propelled a suitable distance out into the water from the edge of the boat.

SUMMARY OF THE INVENTION

The aforementioned objects are achieved by providing an apparatus comprised of a frame attached to a chain. A collecting basket is carried by the frame and has an opening through which oysters are collected. A plurality of scooping teeth are provided at the bottom edge of the opening for directing bottom dwelling oysters into the basket. A pair of pivot arms are rigidly fixed to the basket and pivotally fixed to the frame, one on each side of the basket.

A pair of upright standards are mounted adjacent the edge of a boat, and each standard is provided with an arm-receiving groove. Each groove is configured to receive one of the pivot arms and pivot the frame upwardly about an axis through the arms to empty the contents of the basket through the opening under the influence of gravity. The frame abuts a spring loaded member as it pivots to slow the pivoting movement of the frame and store potential energy for propelling the frame a distance back into the water after emptying of the basket has been completed.

BRIEF DESCRIPTION OF THE DRAWINGS

A better understanding of the invention can be had by reference to the following drawings in which.

DETAILED DESCRIPTION OF THE PREFERRED EMBODIMENT

Figure 1:
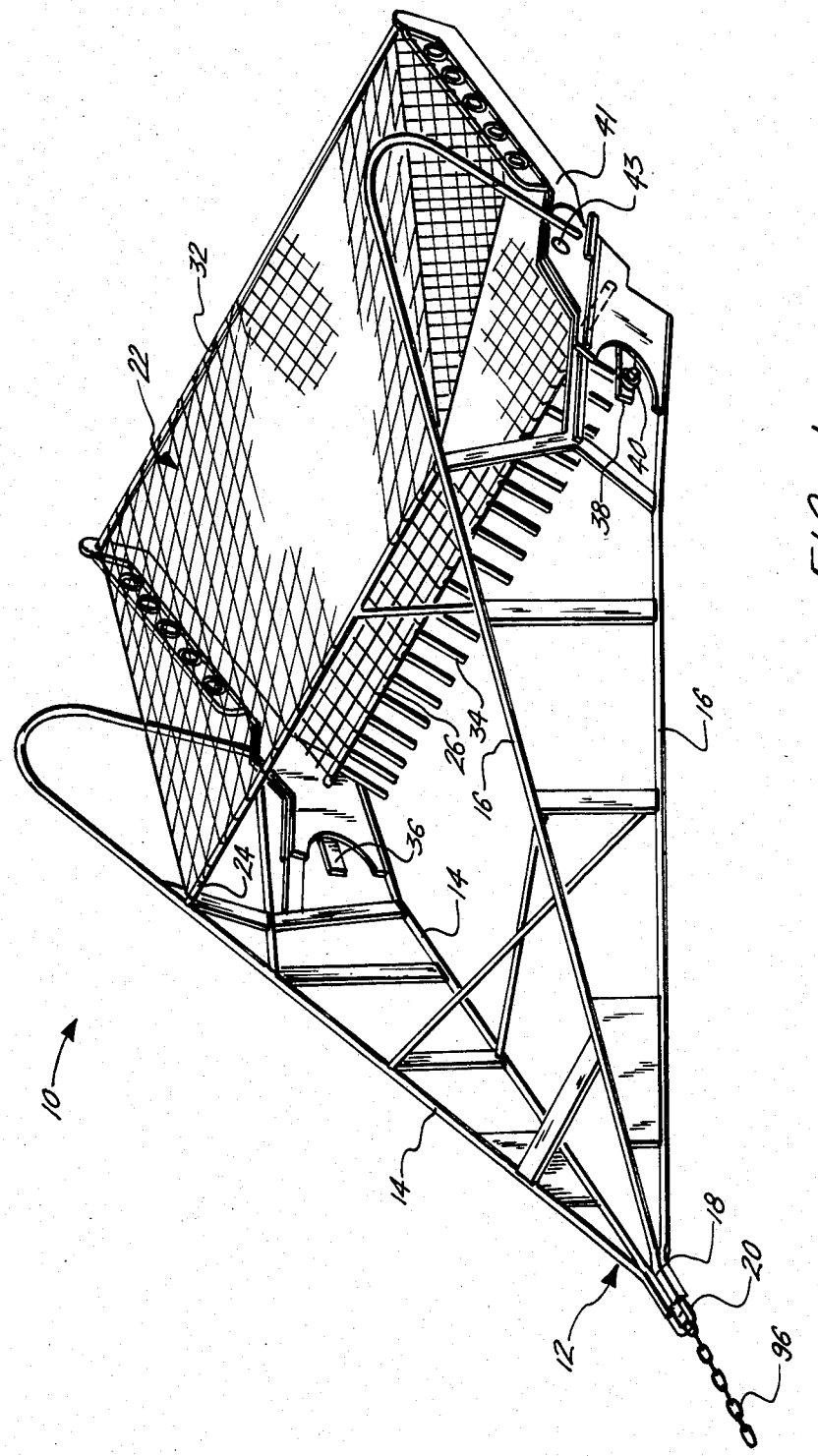
FIG. 1 is a perspective view of the frame and collecting basket of the present invention.

The following detailed description of the preferred embodiment is being made in accordance with requirements of law which require that the inventor disclose the best mode of making and using the invention. This detailed description is not intended to limit the scope of the invention, which is more appropriately construed in accordance with the appended claims.

An apparatus 10 for dredging bottom dwelling seafood such as oysters is seen to be comprised of a generally V-shaped main frame 12 having a pair of diverging members 14, 16 which are joined at the apex 18 of the V. Each member 14, 16 is generally comprised of metal, such as steel or aluminum. A chain attachment means 20 is provided adjacent apex 18, and is in the nature of a small metal loop.

Figure 2:
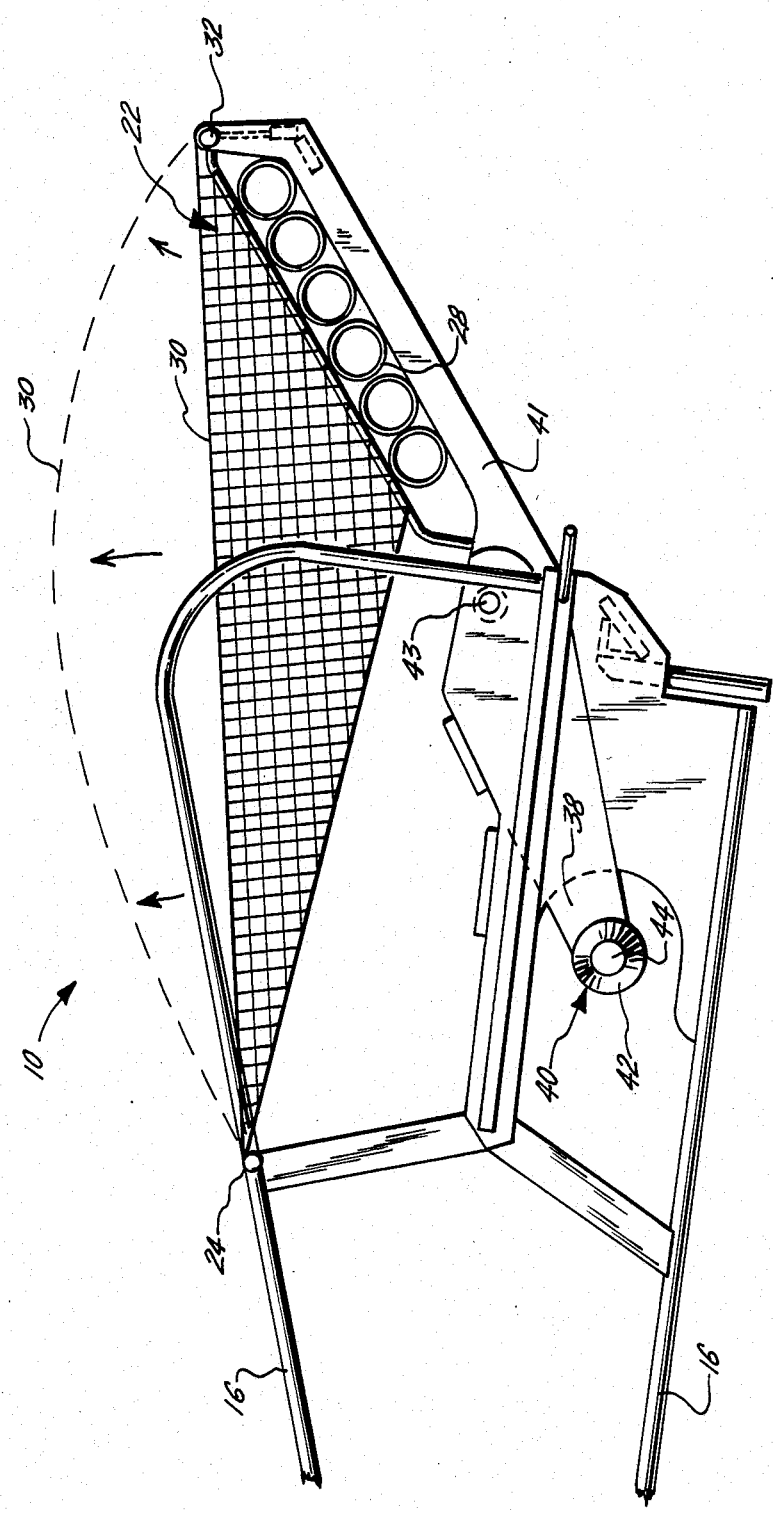
FIG. 2 is an enlarged, fragmentary side view of the collecting basket shown in FIG. 1, the expandable nature of the collecting basket being shown by phantom lines.

A collecting basket 22 is carried between diverging members 14, 16. Basket 22 is mounted on a pair of parallel rods 24, 26 which, as can be seen in FIG. 1, are rigidly attached to frame 12, and is comprised of a foraminous rigid bottom 28, which is made of metal "s" hooks and metal rings and has a leading edge wrapped around rod 26. A basket frame member 41 pivots around pivot point 43 so that the basket 22 rotates relative to frame 12. Basket 22 is further comprised of a foraminous, expandable top 30 which is made of a net material that expands when stretched. As illustrated in FIG. 2, top 30 expands from an unstretched condition shown in solid lines to a stretched condition shown in phantom. The top 30 and bottom 28 of basket 22 are joined along a common edge along rod 32 which extends between members 14, 16 and parallel to rods 24, 26. Basket 22 defines an opening between rods 24, 26 through which oysters are collected. A plurality of rigid, rod-like scooping teeth 34 are disposed in parallel relationship along the leading edge of bottom 28 of the basket 22. Teeth 34 depend downwardly at an angle from rod 26, and scrape along the bottom of a body of water when oyster dredging is taking place.

Figure 4:
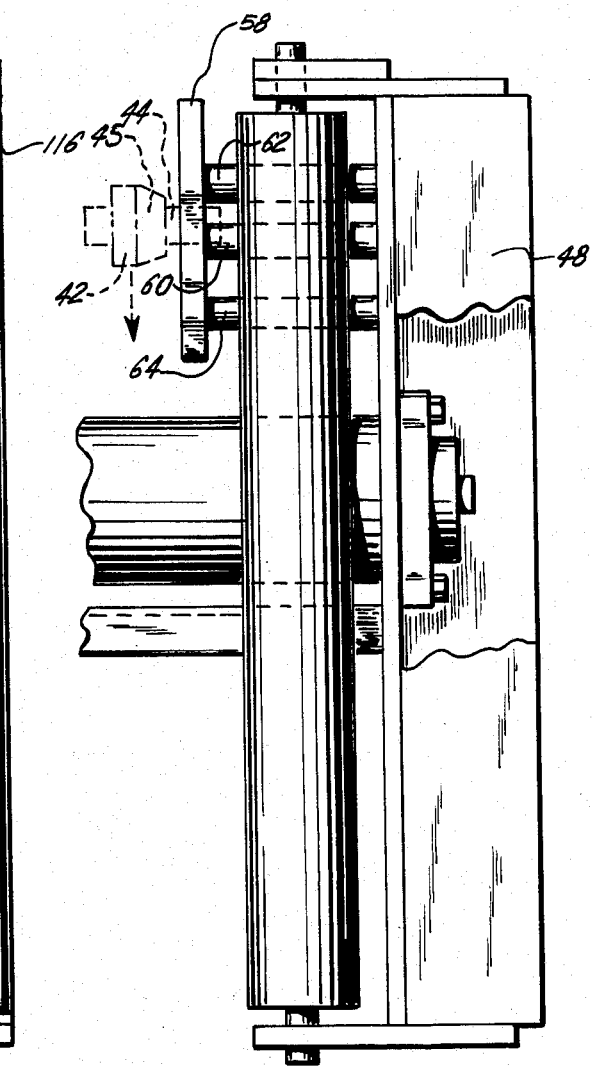
FIG. 4 is a front, fragmentary view of the upright standard shown in FIG. 3.

A first arm 36 and a second arm 38 are rigidly fixed to basket 22, the first arm 36 being carried on a first side of basket 22 and second arm 38 being carried on a second side of basket 22. Arms 36, 38 are substantially parallel to one another, each arm being provided with an outwardly extending protrusion. As shown in greater detail in FIG. 4, each protrusion is comprised of a first, larger diameter cylinder 42, frustoconical portion 45, and a concentric, small diameter cylinder 44.

Arms 36, 38 are rigid extensions from basket frame member 41, and both the arms and member 41 pivot together about pivot point 43.

First and second upright standards 46, 48 are mounted in parallel relationship adjacent the edge 50 of a deck 52 of boat 54. The inside face of each standard 46, 48 contains an arm receiving groove 56, which is shown in detail in FIG. 3. Groove 56 is carried by a rectangular plate 58 which is held in spaced, parallel relationship to each standard by three spacing rods 60, 62, 64. Each groove 56 is configured to receive protrusion 40 therewithin so that frame 41 pivots upwardly about an axis through protrusions 40 on the arms 36, 38 and empties the contents of the basket 22 through the opening under the influence of gravity.

The particular shape of the grooves 56 that allows this to happen is now described in detail. Each plate 58 is comprised of a substantially vertical upper edge 66. Top and bottom spaced, parallel edges 68, 70 slope downwardly from their points of origination 72, 74. A reverse edge 76 slopes downwardly from top edge 68 and toward upper edge 66, the reverse edge 76 terminating in a rounded knob 78. An enlarged area 80 is formed on the opposite side of knob 78 from edge 66, the area 80 having an arcuate upper portion 82 at a distance from the reverse edge 76 which is greater than but substantially equal to the diameter of the protrusion which is received within the groove 56, and upwardly sloping bottom edge 84 which meet to form a substantially angular intersection 86.

Figure 5:
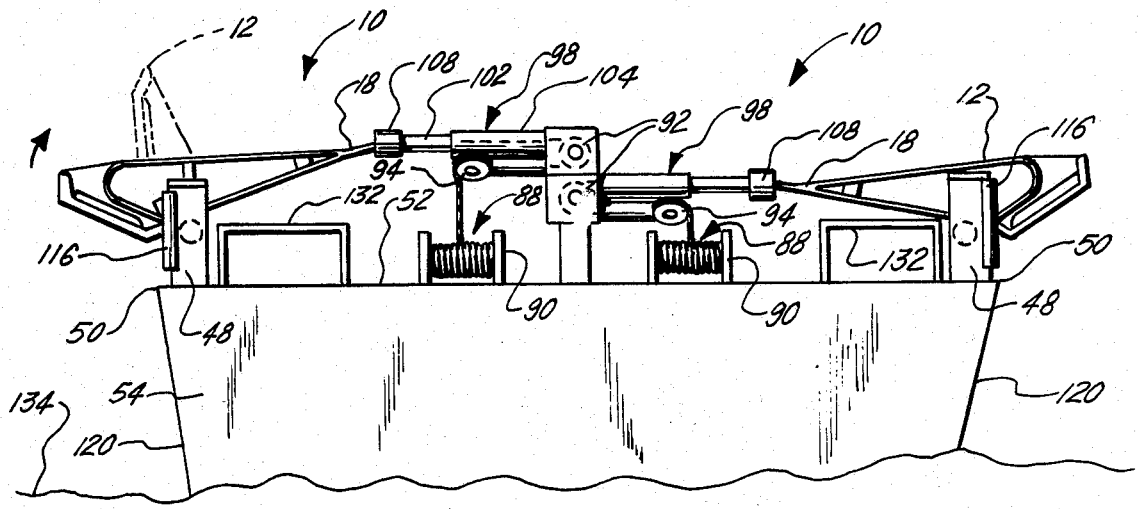
FIG. 5 is an end view of a boat on which a pair of dredging apparatuses are mounted, the spring loaded members being positioned one above the other.

A winch 88 (FIGS. 5 and 6) is comprised of a selectively rotatable cylinder 90 which is rotatably driven by a motor (not shown), the cylinder 90 being mounted on deck 52 of boat 54 inboard of standards 46, 48. The rotational axis of cylinder 90 points between standards 46, 48. A first pulley 92 and a second pulley 94 are provided at a level above winch 88, the pulleys 92, 94 each having a rotational axis perpendicular to the rotational axis of cylinder 90. First pulley 92 is positioned adjacent the back end of a spring loaded member described below, while second pulley 94 is positioned directly above cylinder 90, at a level slightly below the level of pulley 92.

A chain 96 (see FIG. 1) is connected at a first end to attachment means 20 of frame 12, while a second end of chain 96 is secured to the cylinder 90 of winch 88. Chain 96 travels from loop 20 through spring loaded member 98, the chain then being wrapped over and around first pulley 92 (FIG. 5) to reverse its direction and direct the chain towards cylinder 90. Chain 96 is then wrapped around second pulley 94 to direct it downwardly towards cylinder 90.

Figure 7:
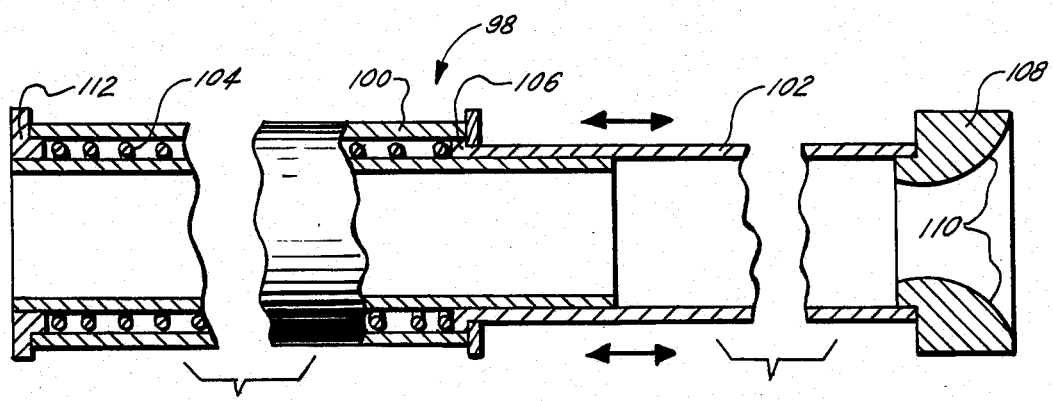
FIG. 7 is an enlarged, fragmentary cross-sectional view of a spring loaded member.

Spring loaded member 98 is disposed around a portion of the chain 96 which is between the loop 20 and winch 88. As best seen in FIG. 7, member 98 is comprised of first and second hollow elements 100, 102, the second element 102 being received in sliding, reciprocal relationship within the first element. First element 100 contains a spring 104 biasing the second element 102 away from the first element 100. Second element 102 has an annular, spring seating end 106 which rests on the top of spring 104, second element 102 further having a frame stopping end 108 which is comprised of an annular sleeve having a parabolic inner surface 110. Chain 96 passes through spring loaded member 98 by entering through open annular frame stopping end 108 of second element 102 and exiting through an annular open end 112 of first element 100.

Figure 8:
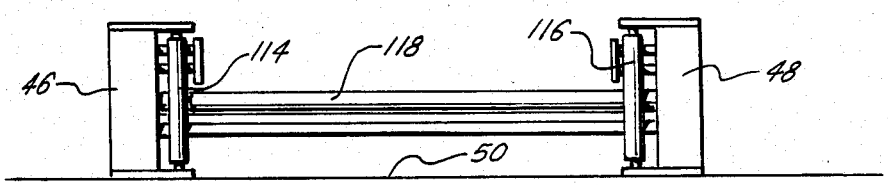
FIG. 8 is a side view of a pair of standards mounted adjacent the edge of a boat, each of the standards having an adjacent upright roller, a horizontal roller being carried between the standards.

An upright roller 114 is provided adjacent standard 46 while a second upright roller 116 is provided adjacent upright standard 48. A horizontal roller 118 (see especially FIG. 8) is carried rotatably between upright standards 46, 48 inboard of the upright rollers, the upright rotatable rollers 114, 116 and horizontal roller 118 cooperatively forming a frame passing area through which the frame 12 passes as it is pulled up the side 120 of the boat 54 and in between standards 46, 48. The rollers help guide the frame and reduce frictional resistance to its movement.

Figure 9:
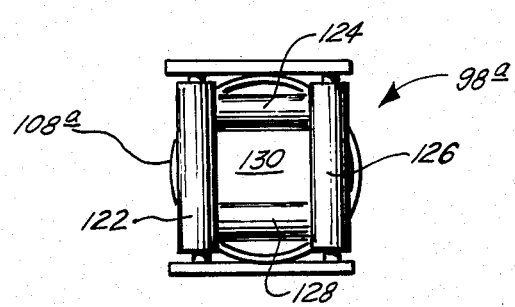
FIG. 9 is an alternate embodiment of the frame abutting portion of the spring loaded member shown in FIG. 7, an open end of the spring loaded member being provided with a plurality of bearing rollers over which the chain rides.

In an alternate embodiment shown in FIG. 9, the frame stopping end 108a of spring loaded member 98a is provided with a plurality of rollers 122, 124, 126, 128 rotatably mounted at right angles to one another to form a chain receiving opening 130. The rollers 122–128 function as bearing surfaces over which the chain moves as it is being pulled through the spring loaded member 98.

In operation, apparatus 10 is dragged along the bottom of a body of water so that teeth 34 scoop oysters into basket 22. As basket 22 fills with oysters, top 30 thereof expands to accommodate the catch. Once basket 22 is full, winch 88 is activated to rotate cylinder 90 in a direction that winds chain 96 onto cylinder 90. As chain 96 is wound in, apparatus 10 is pulled closer to boat 54. When apparatus 10 reaches a position below side 120 of the boat, apparatus 10 is pulled upwardly along side 120 over horizontal roller 118 and between upright rollers 114, 116.

Figure 3:
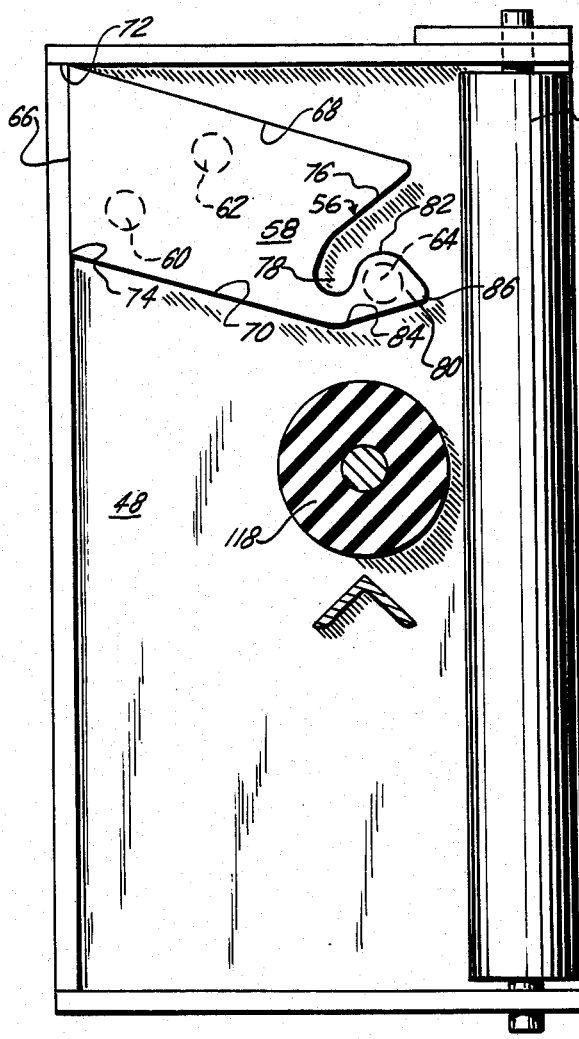
FIG. 3 is a side view of one of the upright standards, the standard being provided with a groove configured to pivot the basket, a pair of perpendicular rollers also being shown for guiding the basket and reducing frictional resistance to its movement between the standards.
Figure 6:
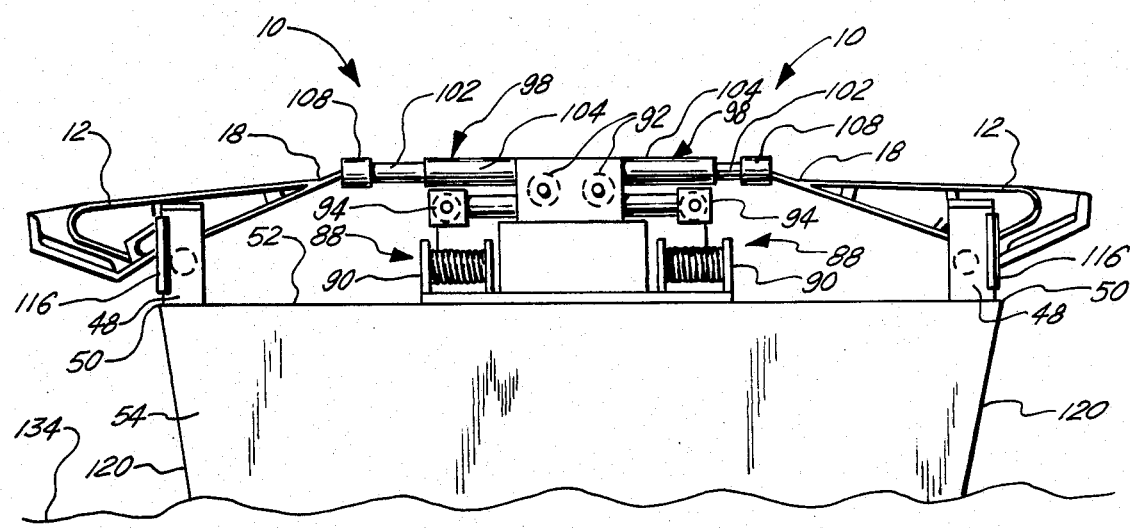
FIG. 6 is a view similar to FIG. 5 showing, however, a pair of spring loaded members mounted in back to back relationship.

As frame 12 enters FIG. 3 from the right, it passes through upright rollers 114, 116 and on top of horizontal roller 118, with the bottom of frame 12 riding over roller 118. Cylinder 44 of protrusion 40 enters groove 56 as it passes past edge 76 and begins to slide down it. As it begins to slide down it, basket 22 begins to rotate upward about pivot point 43 to upend basket 22. This pivoting action is caused by the seating of cylinder 44 against edge 76 while frame 12 continues to be pulled by the force exerted by chain 96. Basket 22 accordingly pivots from the position shown in solid lines on the left hand side of FIG. 5, to the position shown in phantom in FIG. 5. In the preferred embodiment shown in FIG. 5, a table 132 is provided onto which the oysters can be expelled from basket 22. Alternatively, as shown in FIG. 6, no table is provided and the oysters can merely be emptied onto the floor 52 of boat 54.

In order to cushion the translational motion of frame 12 and rotational movement of basket 22 as it is emptying the oysters from the basket, spring loaded member 98 is positioned adjacent standards 46, 48 so that apex 18 of V-shaped frame 12 abutts against frame stopping end 108 of spring loaded member 98 as the basket frame member 41 begins to pivot. As the chain continues to pull apex 18 towards end 108, spring 104 is depressed, thereby gradually slowing the translational and rotational movement of the frame and basket. The result is that the oysters contained in the basket are controllably deposited into the receiving area, such as table 132, without throwing them all over the deck 52 of boat 54.

Once the oysters have been emptied from basket 22, a clutch is released on winch 88 so that cylinder 90 is free to rotate in a reverse direction. The stored potential energy in spring 104 is then converted to kinetic energy as frame 12 is propelled outwardly over the edge 50 of boat 54 to a desirable distance into water 134.

I claim:

1. An apparatus for dredging bottom dwelling seafood such as oysters, comprising:
   a main frame having means for attachment to a pulling means on a vessel;
   a basket frame pivotally mounted about an axis at the lower portion of said main frame;
   a basket carried by the basket frame, the basket having an upper edge and a lower edge and being fixedly attached to the main frame at its upper edge, the basket having an opening between said edges;
   a plurality of scooping members adjacent the opening;
   a pair of arms rigidly fixed to the basket frame; and
   a pair of upright standards mounted on said vessel each containing an arm-receiving groove, the groove being configured to receive the arms and pivot the basket upwardly about said axis to empty the contents of the basket through the opening under the influence of gravity as pulling force is exerted on the main frame.

2. The apparatus of claim 1 further comprising a spring loaded member opposing the pulling of the pulling means as the basket pivots upwardly.

3. The apparatus of claim 2 wherein said spring loaded member is comprised of first and second hollow elements, the second element being received in sliding, reciprocal relationship within the first element, the first element containing a spring for biasing the second element away from the first element, the second element having a spring seating end which rests on the spring and a frame stopping end, the pulling means passing through the spring loaded member.

4. The apparatus of claim 3 further comprising an upright roller adjacent each upright standard and a horizontal roller carried between the upright standards, the upright rollers and horizontal roller cooperatively forming a frame passage area through which the frame passes as it is pulled towards the spring loaded member by the pulling means.

5. The apparatus of claim 4 wherein the upright standards are mounted adjacent the side of a water going vessel, and the spring loaded member is mounted inboard of the upright standards and positioned between the standards.

6. The apparatus of claim 5 wherein the pulling means is a chain, the chain being connected at a first end to the frame and at a second end to a winch.

7. The apparatus of claim 6 wherein the spring loaded member has a first open end in the first element through which the chain enters the spring loaded member and a second open end in the element through which the chain leaves the spring loaded member, the frame having a spring compression portion that abuts against the first end of the first element as the frame pivots to compress the spring loaded member, slow movement of the frame, and provide a source of potential energy for propelling the frame back into the water.

8. The apparatus of claim 7 wherein the first end of the first element is provided with a plurality of rollers which provide a bearing surface over which the chain moves.

9. The apparatus of claim 8 wherein the winch is comprised of a cylinder about which the chain is wound, the rotational axis of the cylinder pointing between the upright standards, a first pulley and second pulley also being provided above the winch, the first and second pulleys each having a rotational axis perpendicular to the rotational axis of the cylinder, the second pulley being positioned adjacent the second end of the spring loaded member, the first pulley being positioned directly above the cylinder.

10. An apparatus for dredging bottom dwelling seafood such as oysters, the apparatus comprising:
    a main frame having means for attachment to a pulling means on a vessel;
    a basket frame pivotally mounted about an axis at the lower portion of said main frame;
    a basket carried by the basket frame, the basket having an upper edge and a lower edge and being fixedly attached to the main frame at its upper edge, the basket having an opening between said edges;
    a plurality of scooping members adjacent the opening;
    a pair of upright standards on said vessel having means for pivoting the basket frame into a basket emptying position; and
    a spring loaded member on said vessel in movement-retarding relationship to the main frame, the spring loaded member slowing movement of the main frame as the basket frame pivots and providing a source of potential energy for propelling the main frame back into the water.

11. The apparatus of claim 10 wherein the spring loaded member stores potential energy as it slows movement of the frame, the potential energy being selectively releaseable to propel the frame away from the spring loaded member.

12. The apparatus of claim 11 wherein said spring loaded member is comprised of first and second hollow elements, the second element being received in sliding, reciprocal relationship within the first element, the first element containing a spring for biasing the second member away from the first member, the second element having a spring seated end which rests on the spring and a frame stopping end, the pulling means passing through the spring loaded member.

13. An apparatus for dredging bottom dwelling seafood such as oysters, the apparatus comprising:
    a generally V-shaped frame having a pair of diverging members joined at the apex of the V;
    a chain attachment means at the apex of the V;

a collecting basket pivotally carried between the diverging members of the V, the basket being comprised of a foraminous rigid bottom with a leading edge, and a foraminous, expandable top in covering relationship to the bottom of the basket, the top and bottom of the basket being joined along a common edge, the basket adjacent the leading edge defining in part an opening through which seafood is collected;

a plurality of scooping teeth disposed in parallel relationship along the leading edge of the bottom of the basket, the scooping teeth depending downwardly at an angle from the leading edge;

a first arm and a second arm rigidly fixed to the basket, the first arm being carried on a first side of the basket and the second arm being carried on a second side of the basket, the arms being substantially parallel to one another, each arm being provided with an outwardly extending protrusion;

first and second upright standards mounted in parallel relationship adjacent the edge of a boat deck, each standard containing an arm receiving groove which is configured to pivot the basket upwardly about an axis through the protrusions on the arms and empty the contents of the basket through the opening under the influence of gravity, each groove being formed in a plate comprised of a substantially vertical upper edge, top and bottom spaced, parallel edges sloping downwardly from their points of origination at the upper edge, a reverse edge sloping downwardly from the top edge and toward the upper edge, the reverse edge terminating in a rounded knob, and an enlarged area on the side of the rounded knob opposite the upper edge, the enlarged area having an arcuate upper portion at a distance from the reverse edge which is greater than but substantially equal to the diameter of the protrusion which is received within the groove, and an upwardly sloping bottom edge;

a winch comprised of a selectively rotatable cylinder mounted on the deck of the boat, the rotational axis of the cylinder pointing between the upright standards, a first pulley and a second pulley also being provided above the winch, the first and second pulleys each having a rotational axis perpendicular to the rotational axis of the cylinder, the second pulley being positioned adjacent the spring loaded member, the first pulley being positioned directly above the cylinder;

a chain connected at a first end to the attachment means of the frame and at a second end to the cylinder of the winch, the chain being wrapped around the first pulley to reverse its direction and direct it towards the cylinder, the chain also being wrapped around the second pulley to direct it downwardly toward the cylinder;

a spring loaded member disposed around the chain between the standards and the winch, the spring loaded member being comprised of first and second hollow elements, the second element being received in sliding, reciprocal relationship within the first element, the first element containing a spring biasing the second element away from the first element, the second element having a spring seating end which rests on the spring and a frame stopping end, the chain passing through the spring loaded member; and an upright roller adjacent each upright standard and a horizontal roller carried between the upright standards, the upright rollers and horizontal roller cooperatively forming a frame passing area through which the frame passes as it is pulled towards the spring loaded member by the pulling means.

14. The apparatus of claim 13 wherein the first end of the first element is provided with a plurality of rollers which provide a bearing surface over which the chain moves.

* * * * *